(No Model.) 3 Sheets—Sheet 2.
E. C. TOWNSEND.
UNDERGROUND HOUSING AND INSULATION FOR ELECTRIC CONDUCTORS.
No. 310,748. Patented Jan. 13, 1885.
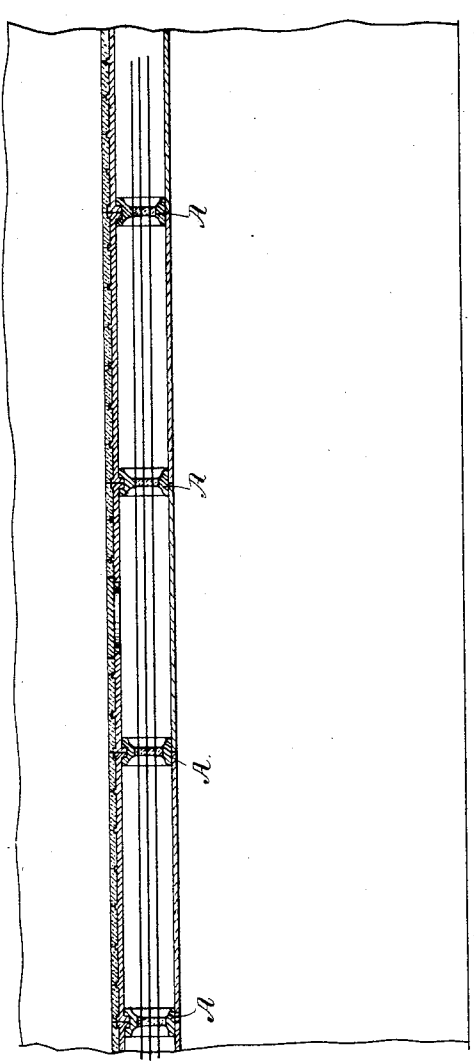
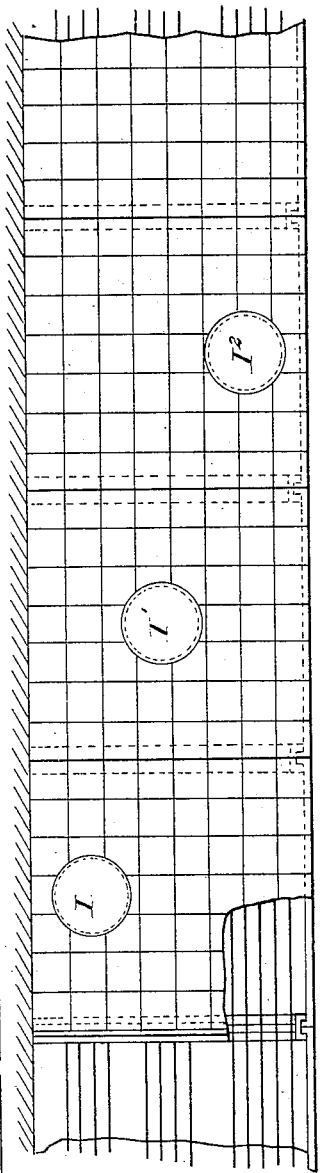
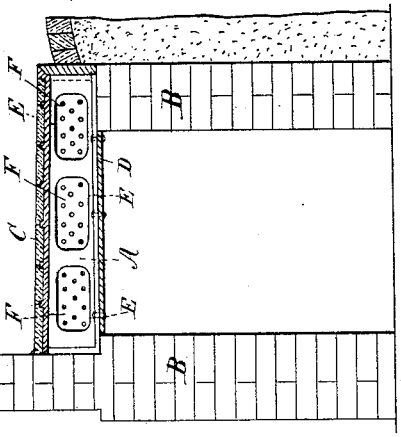
Witnesses:
Inventor
Eli C. Townsend
by J. Fitch
his atty (No Model.) 3 Sheets—Sheet 3.
E. C. TOWNSEND.
UNDERGROUND HOUSING AND INSULATION FOR ELECTRIC CONDUCTORS.
No. 310,748. Patented Jan. 13, 1885.
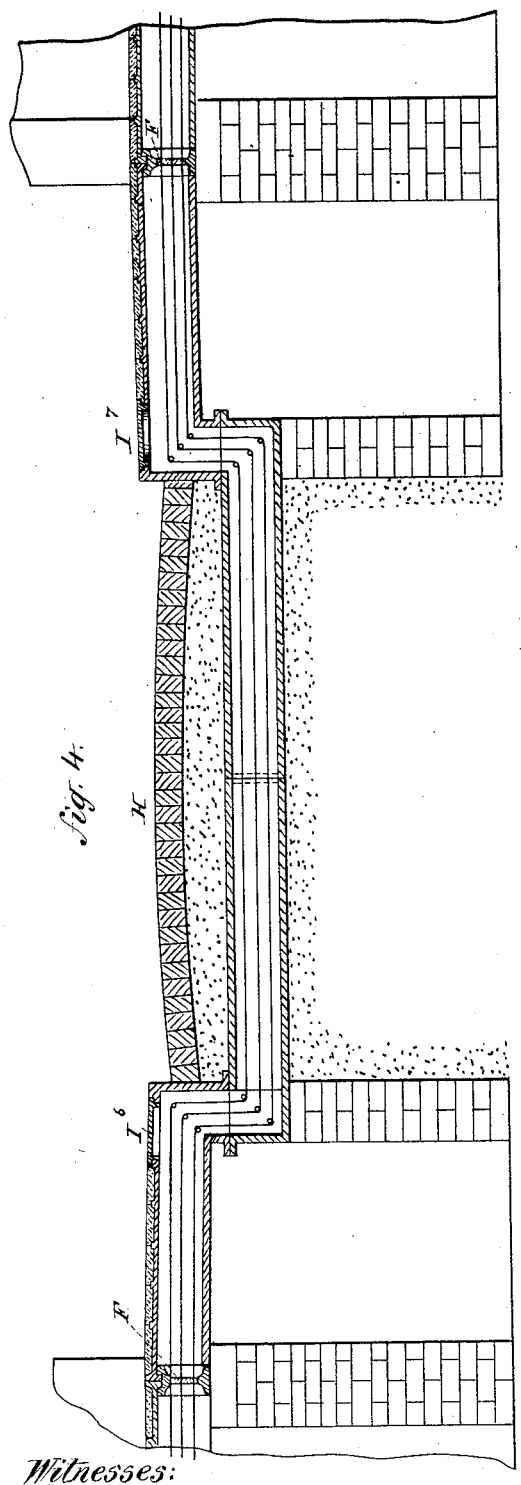
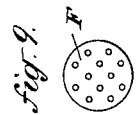
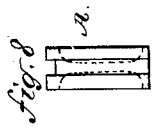
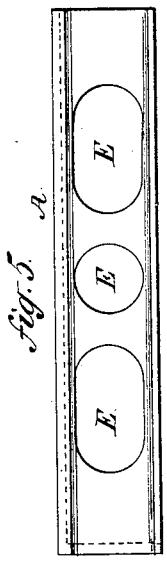
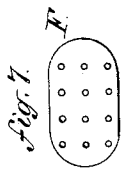
Witnesses:
Inventor
Eli C. Townsend
by J. P. Fitch
his Atty

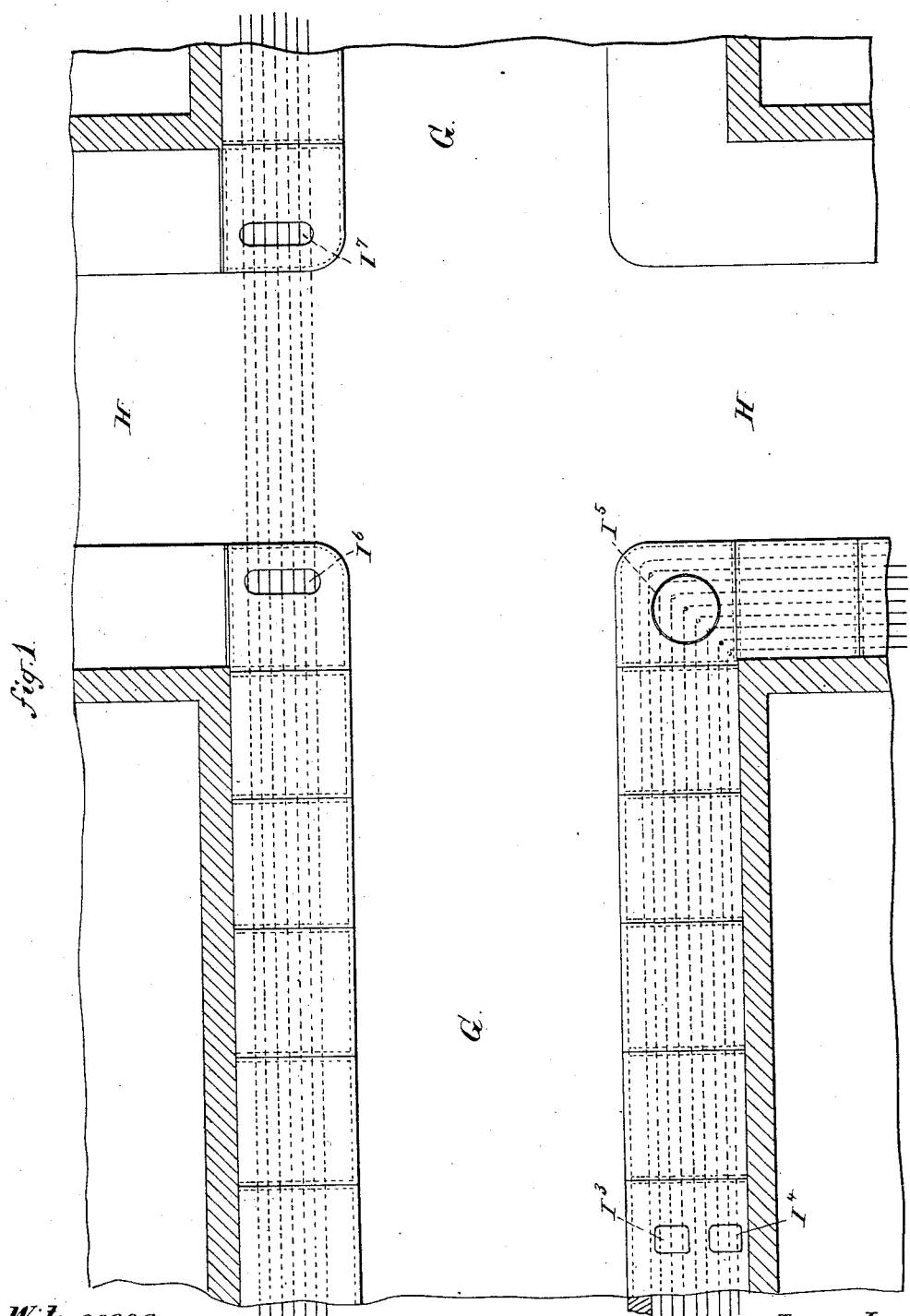

UNITED STATES PATENT OFFICE.

ELI C. TOWNSEND, OF NEW YORK, N. Y.

UNDERGROUND HOUSING AND INSULATION FOR ELECTRIC CONDUCTORS.

SPECIFICATION forming part of Letters Patent No. 310,748, dated January 13, 1885.

Application filed March 31, 1884. (No model.)

*To all whom it may concern:*

Be it known that I, ELI C. TOWNSEND, of the city of New York, in the county and State of New York, have invented new and useful Improvements in Underground Housing and Insulation for Electric Conductors, of which the following is a specification, reference being had to the accompanying drawings, forming part of the same.

The object of my invention is to utilize space in or immediately underneath sidewalks and street-crossings in cities and villages for underground electric wires or conductors; and it consists in the devices herein described and claimed.

Figure 1 is a plan or upper surface view of sidewalks and street-crossings containing my invention. Fig. 2 is a cross-section of such a sidewalk. Fig. 3 is a longitudinal section of the same. Fig. $3\frac{1}{2}$ is an upper surface view of a modified form of the same. Fig. 4 is a cross-section of a street road-bed and longitudinal sections of sidewalks on opposite sides of the street, showing the manner of running the wires across the street between the walks; and Figs. 5 to 9, inclusive, are detail views, to be hereinafter described.

My general plan is to provide an inclosed space or chamber immediately under the surface of the sidewalk in which I lay and insulate the wires, and to carry this chamber or tunnel at the street-crossings a little below the pavement, where it will not be liable to be disturbed by the laying or repairing of the latter.

In carrying out my purpose, I construct the sidewalk of iron beams or girders placed at suitable distances apart—say three or four feet—(designated in the drawings by the letter A) laid transversely across the walk, supported at their ends on suitable abutments or piers, B. These girders are preferably made of wrought-iron, in form what is designated as "I-beams," as shown in the drawings. The upper edges or faces of these beams are channeled or grooved longitudinally, as shown in Figs. 4, 6, and 8. The face of the sidewalk is then formed, preferably, of iron plates C, that rest on and are supported by the girders, each plate extending between two girders, and adjacent plates abutting together over the center of the upper face of the girder, each plate being provided on its under edge with a downwardly-projecting lip or flange that fits into the groove in the girder, the lips of the two abutting plates fitting the said groove, as seen in Fig. 4. These plates may be solid, or they may be perforated with openings, into which heavy glass may be fitted and cemented for the purpose of admitting light into vaults or other spaces underneath the walk, when desired. The space between the upper and lower faces of the girders may be completely inclosed, if preferred, by plates of iron or other suitable material, D, as seen in Figs. 1 and 2. In the web of these girders are made openings E through them, which are fitted with some suitable insulating material, and these insulators, F, being pierced with holes, the electric wires are passed through the holes, and are thus supported and insulated within the described chamber or space immediately underneath the surface or sidewalk. At the street-crossings a channel or chamber is excavated below the flagging of the street, and a space inclosed by suitable plates of iron, stone, or other proper material, with a layer of earth over the same forming the road-bed under the flagging, and upon this the flagging is laid, as shown in Fig. 4. The chamber in the sidewalk is made continuous with that across the street by carrying the same down within the line of the curb from the sidewalk to the level of the chamber in the street, as seen in Fig. 4, the wires being supported upon proper insulators within the chambers at the angles, where they are bent to follow the chamber, as seen in said figure.

In Fig. 1, G and H represent two streets crossing each other, with the sidewalks on opposite sides of the same constructed as I have described. In the lower left-hand figure the wires are represented in dotted lines as turning at right angles and running under sidewalks on the sides of the two intersecting streets.

Man-holes in the face of the sidewalk may be formed at suitable distances apart, as seen at I I' I² I³ I⁴ I⁵ I⁶ I⁷, for the purpose of providing ready access to the wires without removing the plates of the walk.

The joints of all the plates may be made water-tight by any suitable cementing. Manholes are to be provided with covers, and are also to be cemented to the walk, so as to exclude water.

What I claim as my invention, and desire to secure by Letters Patent, is—

1. The described water-tight chamber under a sidewalk, formed by means of the iron beams A, across the sidewalk, and resting on suitable supports, iron plates C, laid with water-tight joints on said beams to form the surface of the walk, and iron plates secured with water-tight joints to the under faces of said beams, together with means for supporting and insulating wires within said chamber, consisting of the insulators F, supported in openings E in the said beams, all as and for the purpose described.

2. The combination, with girders A, provided with the openings E, of the perforated insulators F, placed and supported in said openings.

ELI C. TOWNSEND.

Witnesses:
ROBERT JACKSON,
A. G. N. VERMILYA.